United States Patent [19]
Berrettini

[11] 3,958,443
[45] May 25, 1976

[54] APPARATUS FOR PROVING AND CALIBRATING CRYOGENIC FLOW METERS

[75] Inventor: Bruce Joseph Berrettini, Allentown, Pa.

[73] Assignee: Air Products and Chemicals, Inc., Allentown, Pa.

[22] Filed: June 17, 1974

[21] Appl. No.: 480,050

[52] U.S. Cl. .............................. 73/3; 73/194 VS; 73/194 M
[51] Int. Cl.² ........................................ G01F 25/00
[58] Field of Search ................. 73/3, 194 A, 194 B, 73/194 C

[56] References Cited
UNITED STATES PATENTS

| | | |
|---|---|---|
| 3,457,768 | 7/1969 | Jasek ........................................ 73/3 |
| 3,580,045 | 1/1975 | Pfrehm ..................................... 73/3 |
| 3,788,141 | 1/1974 | Blackwell ........................... 73/194 B |

Primary Examiner—S. Clement Swisher
Attorney, Agent, or Firm—James C. Simmons; Barry Moyerman

[57] ABSTRACT

A method and apparatus for proving and calibrating meters used to measure the amount of cryogen dispensed from a storage receptacle. The apparatus can be lightweight and portable for verifying meters in the field and it is possible with the apparatus to prove or calibrate both volumetric and mass flow type cryogenic meters. The apparatus is further characterized by providing for simultaneously using the meter under test to record the amount dispensed and using the test apparatus to measure the temperature, pressure, volume, flow rate, and time to prove the meter under test by physical determination of the amount of product dispensed. Furthermore, the apparatus of the present invention can serve as a Cryogenic Liquid Meter Transfer Standard which meets the National Bureau of Standards specifications for such devices.

8 Claims, 7 Drawing Figures

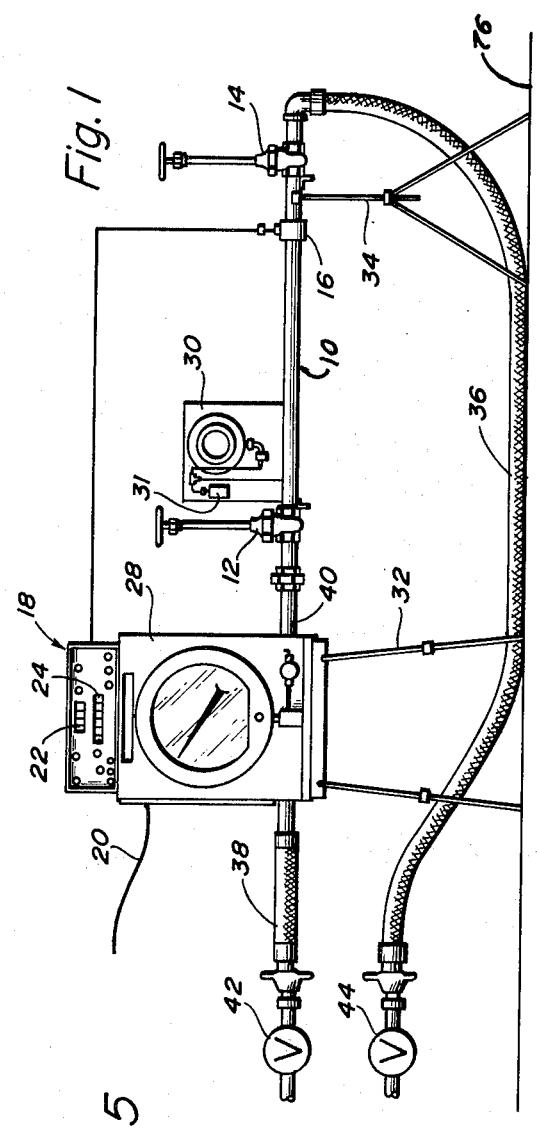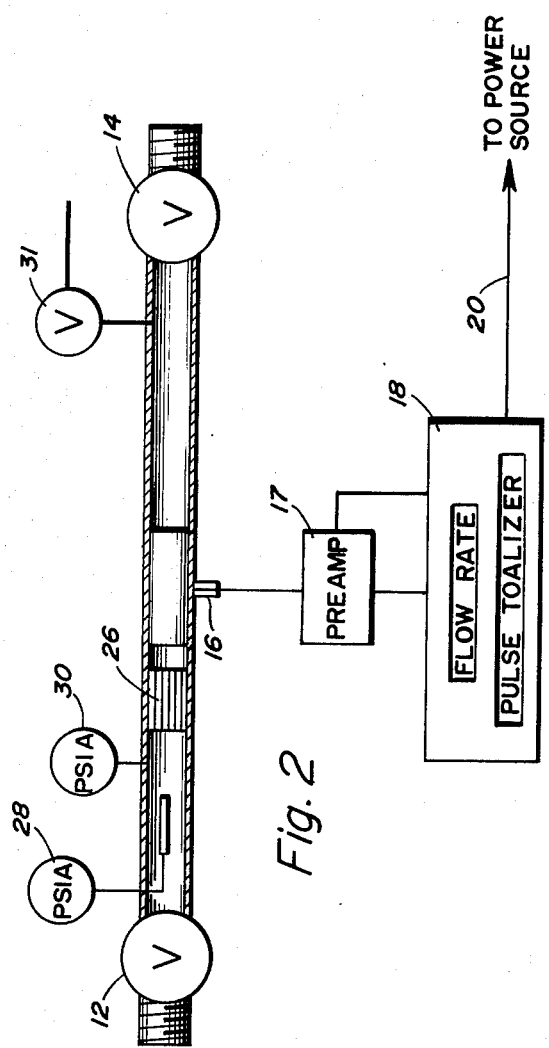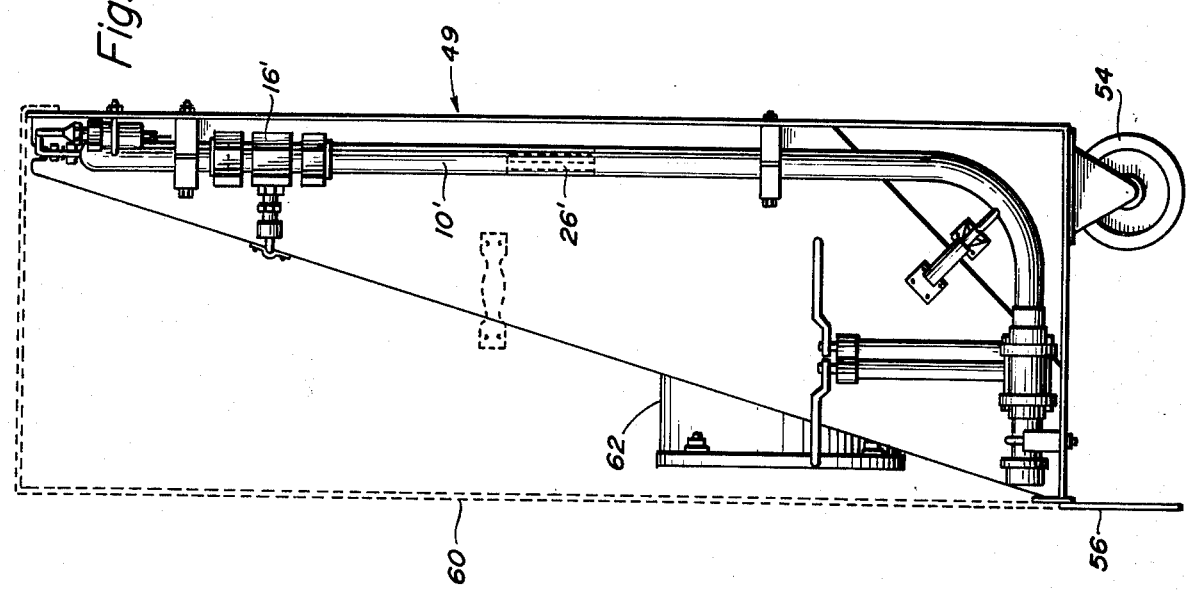

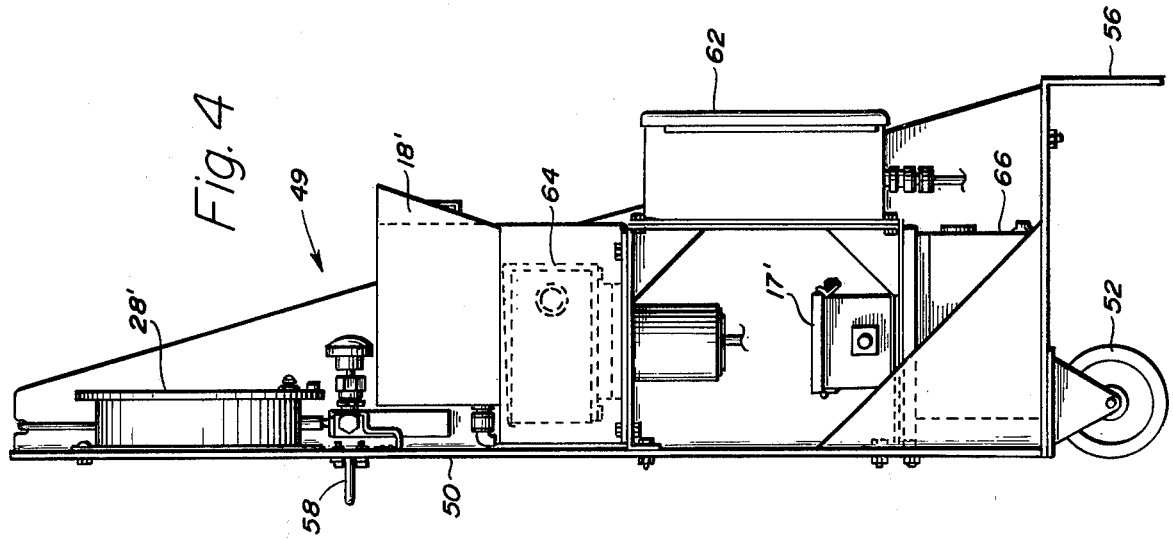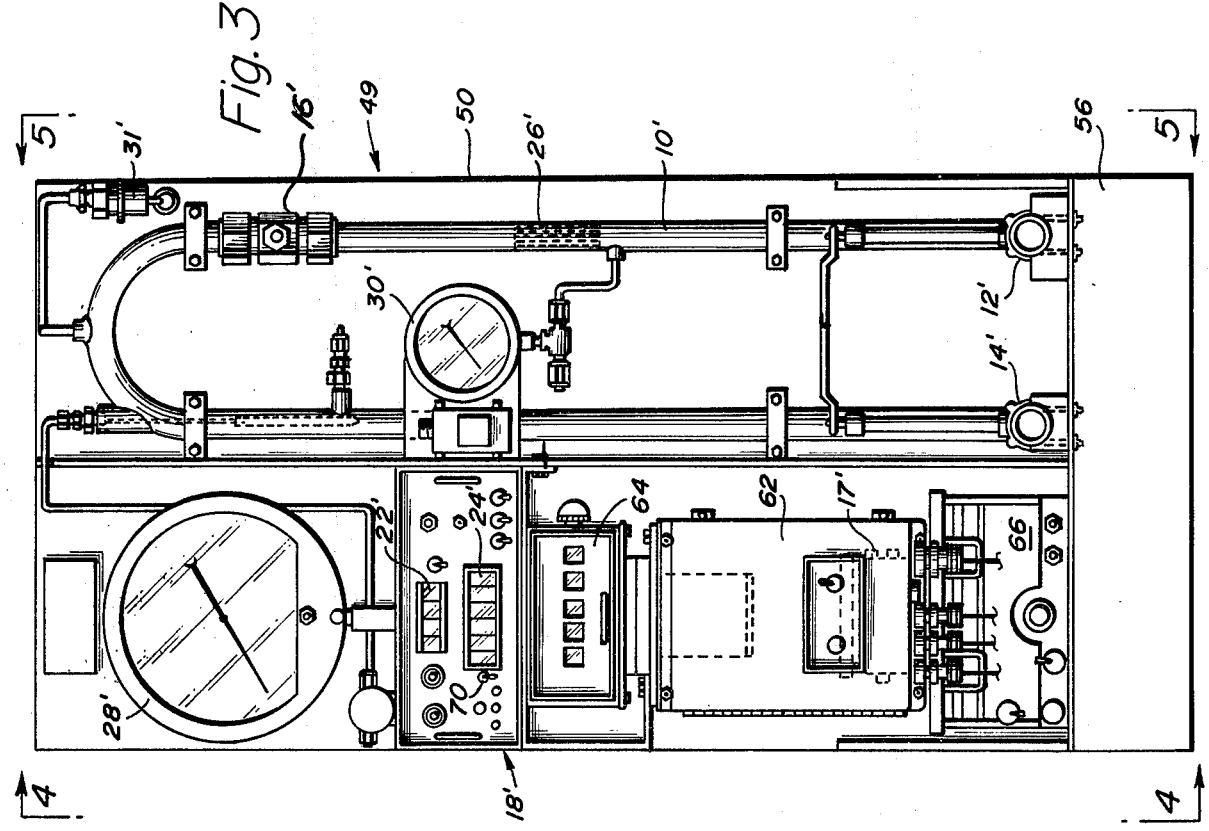

APPARATUS FOR PROVING AND CALIBRATING CRYOGENIC FLOW METERS

BACKGROUND OF THE INVENTION

This invention pertains to methods and apparatus for proving, verifying, or calibrating a flow meter of the type used to measure volume dispensed from a storage receptacle. In particular, the method and apparatus are used for proving, verifying, or calibrating flow meters used in the dispensing of cryogenic fluids (cryogens) from storage tanks, mobile trailers, and the like.

Calibration of cryogenic flow meters is usually accomplished by comparing the meter under test against a given volume of fluid dispensed into a tank and weighed. Such testing is normally accomplished in a laboratory environment using a flow loop in which the meter to be tested is installed. The meter is physically removed from the trailer or dispensing apparatus and sent to the laboratory. The flow loop consists of a cryogenic storage vessel, a pump, a weighing system, and a receptacle so that the precise weight can be obtained and the amount of fluid dispensed calculated for calibrating the meter. The flow loop testing has some disadvantages in that the piping and other equipment may not duplicate the in-service environment, e.g. a large number of flow meters are affected by changes in the geometry of the associated piping. The use of truck platform scales is undesirable because of the fact that such scales can be subject to errors caused by the wind, accumulated moisture, and other environmental factors at the test site. Furthermore, a flow loop would normally be required in each state or used among the several states. Normally, one state will generally not accept the flow loop testing of another state.

SUMMARY OF THE INVENTION

In order to avoid the above-mentioned problems and to provide a more rapid and reliable method of testing a cryogenic flow meter, it has been discovered that a proving, verifying, or calibration apparatus can be achieved by combining a length of conduit in series with the meter under test. In the length of conduit, the cryogen flowing through the meter under test is then subjected to measurement of its temperature, line pressure, flow rate, and volume. The measurements can then be corrected for any calibration factors in the instruments and the data can be used to accurately determine the amount of cryogen dispensed. This calculation can then be compared to the meter under test and the error noted. With the apparatus of the present invention, it is possible to calibrate both volumetric type and mass flow type meters because all of the necessary measurements can be taken by the lightweight, portable apparatus to be disclosed hereinafter. Combining the basic measurement tools with electronic conversion and calculation devices, can result in a direct comparative reading between the meter under test and the calibration devices.

Therefore, it is the primary object of this invention to provide a Cryogenic Liquid Meter Transfer Standard.

It is a principal object of the present invention to provide an improved meter proving, verifying, or calibrating device.

It is another object of the present invention to provide a meter calibrating device that is readily portable.

It is yet another object of the present invention to provide a meter proving, verifying, or calibrating device that can be used in series with the meter undergoing tests for a direct comparison without removing the meter from the dispensing apparatus.

It is a further object of this invention to provide a method for verifying, proving, or calibrating both volumetric and mass flow type meters.

It is still a further object of the present invention to provide a single apparatus for proving, verifying, or calibrating both mass flow and volumetric flow type cryogenic fluid dispensing meters.

BRIEF DESCRIPTION OF THE DRAWING

FIG. 1 is a front elevational view of a system according to the present invention shown ready to conduct a meter calibration.

FIG. 2 is a schematic diagram showing the method and apparatus for collecting data according to the present invention.

FIG. 3 is a front elevational view of an alternate embodiment according to the present invention.

FIG. 4 is a view taken along the line 4—4 of FIG. 3.

FIG. 5 is a view taken along the line 5—5 of FIG. 1 and includes in dashed lines the shipping cover according to the invention.

DETAILED DESCRIPTION OF THE PREFERRED EMBODIMENT

Figure 6:
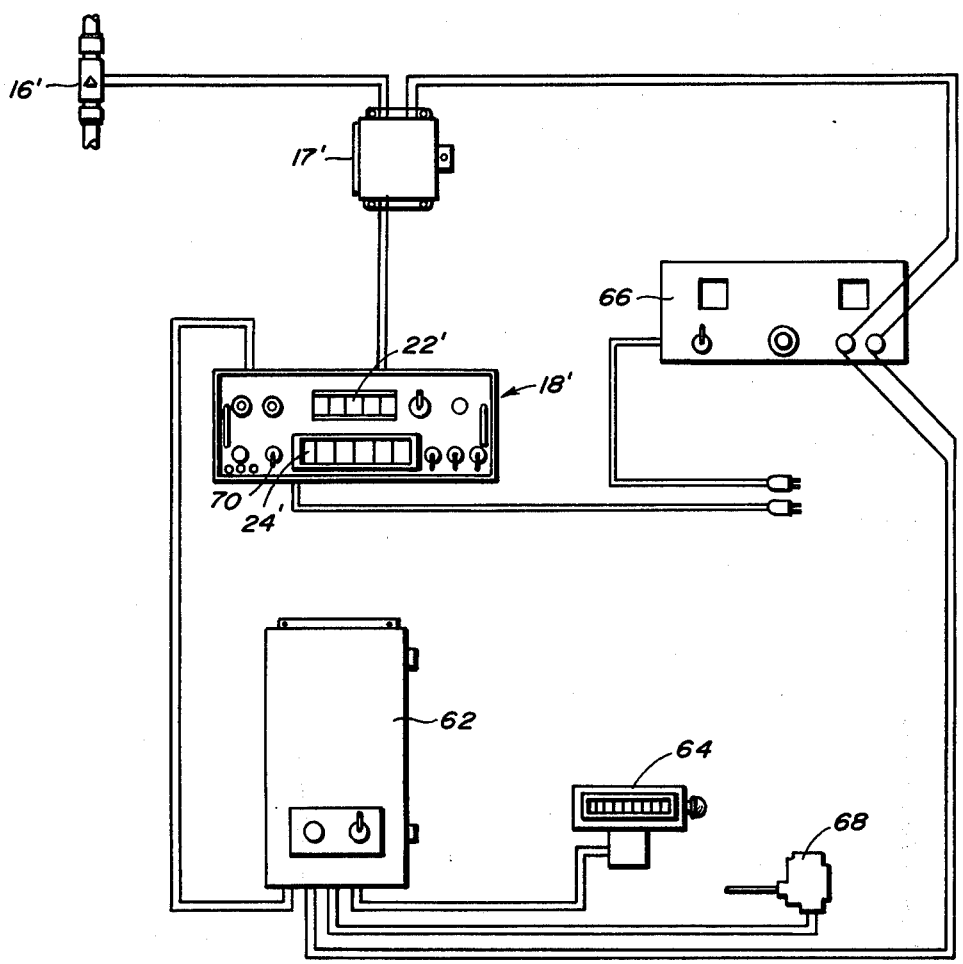
FIG. 6 is a schematic diagram of the wiring for the device of the embodiment shown in FIG. 3–5.

There is shown in FIG. 1 a meter proving apparatus consisting of a conduit 10 having inlet control valve 12 and outlet control valve 14. Near the outlet control valve 14 is a volumetric measuring element 16 such as is manufactured and sold by Eastech, Inc. of South Plainfield, New Jersey. The volumetric measuring element 16 operates on the phenomenon known as vortex shedding. Vortex shedding is that phenomenon which causes a flag on a flagpole to flutter in the breeze. Basically, as the flow passes the solid object, e.g. flagpole, there are eddy currents induced on the downwind side of the pole. The volumetric measuring element 16 uses a bluff body facing the flow path of the stream as will hereinafter be explained to generate eddys in the stream. These eddys can then be detected in the form of pulses and the pulses can be converted to an indication proportional to fluid flow as will hereinafter be more fully explained The volumetric measuring element 16 is connected to a flow computer 18 such as Model 30 H-B Industries, manufactured Jersey. sold by Hoffer Flow Controls, Inc., Port Monmouth, New Jersey, The flow computer 18 takes the pulses generated by the volumetric measuring element 16 and converts the pulses into a measure of flow rate and totalizes these pulses which can then be used to determine the volume of fluid passing through the measuring element 16. Flow computer 18 is connected to a suitable source of power by conduit 20 and the data is displayed on indicators 22, 24, indicator 22 showing flow rate and indicator 24 showing the total number of pulses counted by the volumetric measuring element 16. Prior to entering the measuring element 16, the fluid flows past a flow straightener 26 (FIG. 2) and aids in precise volumetric measuring. The system of FIG. 1 includes a vapor pressure measuring device 28 which consists of a Heise Model CMM pressure guage with a 12-inch dial reading in 0.1 psia increments from 0 to 215 psia. Such pressure gauges are manufactured and sold by Heise Bourdon Tube Co., Newton, Connecticut, and later fitted with the appropriately designed and charged vapor bulb and tubing section 40 as is known in the art. Also included in the system is a line pressure measuring device 30 reading in increments of 5 psia from 0–400 psia, such as manufactured and sold by Robertshaw Controls Co., Knoxville, Tennessee. The line pressure measuring device 30 includes a thermal relief valve 31 to prevent over pressurization of conduit 10.

As shown in FIG. 2 between the volumetric measuring element 16 and the computer 18, is a preamplifier 17, the preamplifier taking pulses generated in the sensor in measuring element 16 and converting them into voltage signals which are amplified and shaped into the form of a pulse train which pulse train has a frequency proportional to the flow rate. The pulse train is then fed to the computer for display as set out above.

The system of FIG. 1 includes two portable stands 32, 34 to support conduit 10 and associated instrumentation level with grade shown as 76. The system includes necessary couplings 36 and 38 for bringing the fluid to the system. Shown as 42 and 44 are delivery and throttling valves respectively for admitting the cryogen to the system. Downstream of the outlet gate valve 14 is a flexible cryogenic conduit 36 connected to the throttling valve 44.

In operation, valve 42 is normally the delivery valve from the storage receptacle which holds the cryogenic fluid to be dispensed. The receptacle can be a stationary tank or a vehicular mounted tank. Upstream of valve 42, there is generally a meter whereby the cryogenic fluid can be dispensed according to the customer's requirements. Such meters are well known in the art, one being an H-B Industries Model 27 Cryogenic Delivery Truck Totalizer manufactured and sold by Hoffer Flow Controls, Inc. of Port Monmouth, New Jersey. This type of meter contains a turbine-type flow meter with correction devices to reflect the change in fluid density due to temperature change. The output is displayed on dials, such as commonly seen in the dispensing of automotive fuel at the retail level. The valve 44 can be connected to a delivery receptacle such as a customer's storage vessel or can be returned to the vessel from which the fluid was originally drawn.

In operation, the cryogenic liquid is caused to flow through valve 42, through conduit 38, through meter 28, through conduit 40, through conduit 10, through flow element 16 and finally past valve 14 and out through conduit 36. As the cryogenic fluid is flowing, meter 28 records the vapor pressure and, hence, the temperature of the cryogenic fluid is accurately determined. The line pressure is determined by meter 30 and the flow rate by volumetric measuring element 16 and displayed on computer 18. Using the National Bureau of Standards tables and charts, the temperature and pressure can be used to calculate the density of the liquid flowing through the test conduit 10. This information, in combination with the accumulated volumetric pulse data, will lead to a determination of the mass of the cryogenic fluid flowing through this system. This accurate determination of the mass then can be used to calibrate the dispensing meter if the meter is set to read based upon mass flow. If the dispensing meter is of the volumetric type, the number of pulses displayed on flow computer 18 and indicator 24 can then be used to determine the volume of fluid dispensed. The calculation consists of dividing the number of accumulated pulses on indicator 24 by the number of pulses per gallon (K-factor) of flow element 16 as determined over the flow range of element 16 by the National Bureau of Standards Cryogenic Flow Research Facility.

The raw data collected can be subjected to comparison and correction by correction factors which are determined in advance by a National Bureau of Standards Flow Loop Testing of the device. The corrected amount of product measured can then be compared to the net accumulative amount registered on the meter under test, not shown. The difference is then divided by the net (corrected) amount measured by the transfer standard shown in FIG. 1 ($\times$ 100) to establish the percent of error in the meter being tested. Tests run with a device according to the present invention have shown residual standard deviation (accuracies) within $\pm 0.2\%$ are possible, as determined by the National Bureau of Standards Cryogenic Flow Research Facility at Boulder Colorado. Residual Standard deviation means the standard deviation computed from the residuals (deviations expressed as percentages) of data points from a fitted curve.

Referring now to FIGS. 3–6, there is shown an alternate embodiment of the present invention comprising a portable transfer standard 49 mounted on a permanent frame 50, the frame 50 having associated wheels 52, 54, and supporting skirt 56. Handle 58 is included for ready manipulation of the test stand (standard). There is shown in FIG. 5 a cover 60 which can be used to isolate the instrumentation from unnecessary contact with foreign objects during its transportation.

Referring to FIG. 3, the standard includes a conduit 10' in the form of a U-tube with inlet valve 12' and outlet valve 14'. The conduit 10' includes a flow straightener 26' a volumetric measuring element 16' such as disclosed in connection with FIG. 1 and manufactured by Eastech, Inc.

Conduit 10' includes a line pressure measuring instrument 30' and associated vapor pressure measuring device 28'. The flow computer 18' displaying both flow rate 22' and total pulses 24'. In the apparatus of FIGS. 3–6, the flow computer 18' and indicator 24' can also be used to display elapsed time in increments of 0.01 seconds. This feature is standard in a Model 30 H-B Industries flow computer. The transfer standard also includes a Model 26 H-B Industries temperature compensating scaler 62 and a register 64 manufactured and sold by Hoffer Flow Controls, Inc. Associated with the temperature compensating scaling totalizer 62, is a commercially available 115 VAC-12 VDC Power Supply 66. The electrical wiring diagram for the test stand of FIGS. 3–5 is shown in FIG. 6 wherein the data from volumetric measuring element 16' is fed through preamplifier 17' to the flow computer 18'. In flow computer 18', the flow rate is read as indicator 22' and the total number of pulses on indicator 24'. The pulse signal is fed from the computer 18' to the scaler 62 where it is further amplified and scaled to operate totalizer 64 to directly show the total fluid dispensed on indicator 64. The scaler 62 includes an automatic temperature compensating circuit in conjunction with temperature probe 68 which can be activated with a selector switch (not shown) provided on scaler 62. This feature permits totalizer 64 to indicate a volume of fluid dispensed which has been corrected for temperature. The power supply 66 provides the necessary voltage for the preamplifier 17' and the scaler 62 as shown.

In order to prove, verify, or calibrate a dispensing meter, the conduit from the dispensing meter is connected at 12' and the fluid is throttled through discharge valve 14'. As the cryogenic fluid flows around conduit 10', the various data can be measured. The system shown also includes a start/stop switch 70 that controls the flow of pulses from preamplifier 17' and thus the data displayed on flow computer 18' and totalizer 64. After fluid flow is established through the test standard and the meter under test, all resettable indicators are set at zero. The start/stop switch 70 is turned on and data collection begins. When this occurs, the indicating totalizers (24' and 64) on the device and on the meter to be tested (electrical type) simultaneously begin to totalize. When a predetermined amount of fluid has passed through the device, the start/stop switch is turned off to simultaneously stop all of the totalizers. The data collected from the transfer standard (temperature, pressure, volume, flow rate, and time) are used in connection with correction factors, if any, as determined by the National Bureau of Standards Flow Loop Testing of the device to arrive at a corrected amount of product measured. As before, the corrected amount can then be compared to the device under test and the percent of error of the meter under test determined.

Figure 7:
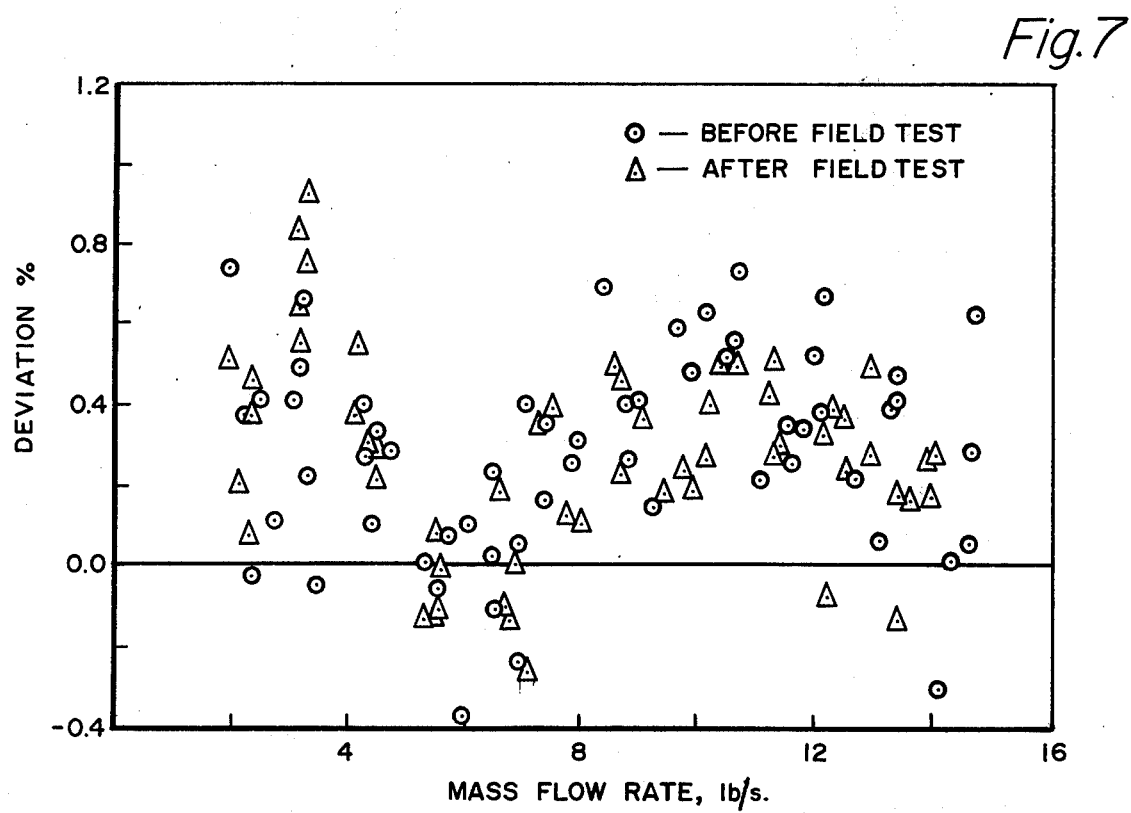
FIG. 7 is a plot of percent deviation vs. mass flow rate for a transfer standard acccording to the present invention tested against a standard flow loop before and after field use.

There is shown in FIG. 7 a plot of accuracy data for a transfer standard according to FIGS. 3–6 as measured by the flow loop test facility of the National Bureau of Standards before and after field testing.

Table I shows actual test results for the transfer standard of FIGS. 3–6 used to determine the accuracy of several commercially used dispensing meters in the field.

TABLE I

| Truck Meter Type | Run No. | TRANSFER STANDARD DATA | | | | | TRUCK METER DATA | | | Error | |
|---|---|---|---|---|---|---|---|---|---|---|---|
| | | Indicated Delivery (Gallons) | Time (sec.) | Vapor Pressure (psia) | Line Pressure (psia) | Flow Rate Correction Factor | Initial Reading | Final Reading | Meter Fluid Density Factor | Corrected Mass Basis % | Mass Basis % |
| Turbine (Volumetric) | 1 | 200.0 | 235.63 | 25.7 | 126 | 0.9989 | 0 | 193.8 | 6.7381 | −0.30 | −0.28 |
| | 2 | 205.3 | 240.59 | 25.6 | 127 | 0.9989 | 0 | 200 | '' | 0.23 | 0.23 |
| | 3 | 307.7 | 360.07 | 25.5 | 127 | 0.9989 | 0 | 300 | '' | 0.31 | 0.29 |
| | 4 | 205.7 | 240.61 | 25.5 | 127 | 0.9989 | 0 | 200.1 | '' | 0.09 | 0.06 |
| | 5 | 206.4 | 105.55 | 24.2 | 95 | 0.9959 | 0 | 199.9 | '' | −0.03 | −0.28 |
| | 6 | 206.6 | 107.54 | 25.5 | 93 | 0.9957 | 0 | 200 | '' | −0.08 | −0.02 |
| | 7 | 206.6 | 631.40 | 30.4 | 100 | 0.9952 | 0 | 200 | '' | −0.03 | 1.09 |
| | 8 | 205.4 | 242.35 | 25.4 | 130 | 0.9989 | 0 | 200.1 | '' | 0.23 | 0.18 |
| | 9 | 206.0 | 576.34 | 30.0 | 118 | 0.9957 | 0 | 200 | '' | 0.21 | 1.21 |
| Vortex Shedding A (Volumetric) | 1 | 201.5 | 597.77 | 71.9 | 36 | 0.9973 | 10 | 200 | 9.5222 | −2.95 | −3.90 |
| | 2 | 200.7 | 300.74 | 72.2 | 87 | 0.9987 | 250 | 440 | '' | −2.69 | −3.70 |
| | 3 | 219.9 | 229.66 | 72.0 | 127 | 0.9967 | 570 | 779 | '' | −2.12 | −3.20 |
| | 4 | 200.8 | 208.22 | 72.2 | 132 | 0.9966 | 920 | 1110 | '' | −2.55 | −3.61 |
| | 5 | 200.9 | 181.56 | 74.6 | 160 | 0.9957 | 1186 | 1376 | '' | −2.50 | −3.43 |
| | 6 | 200.4 | 592.03 | 70.4 | 62 | 0.9974 | 0 | 189 | '' | −2.93 | −4.03 |
| | 7 | 201.0 | 265.07 | 65.4 | 90 | 0.9982 | 0 | 190 | '' | −2.79 | −4.33 |
| | 8 | 202.0 | 166.48 | 68.7 | 188 | 0.9954 | 0 | 190 | '' | −3.00 | −4.41 |
| | 9 | 200.9 | 394.95 | 67.6 | 108 | 0.9988 | 0 | 189 | '' | −3.32 | −4.69 |
| | 10 | 200.2 | 589.13 | 72.0 | 125 | 0.9974 | 0 | 188 | '' | −3.35 | −4.42 |
| | 11 | 200.9 | 307.00 | 66.3 | 92 | 0.9987 | 0 | 189 | '' | −3.31 | −4.77 |
| Vortex Shedding B (Volumetric) | 1 | 204.2 | 102.00 | 25.2 | 80 | 0.9961 | 0 | 200 | 6.7381 | 1.05 | 1.07 |
| | 2 | 204.1 | 105.00 | 25.1 | 77 | 0.9958 | 0 | 199.5 | '' | 0.88 | 0.88 |
| | 3 | 203.8 | 143.53 | 27.3 | 140 | 0.9965 | 0 | 200.0 | '' | 1.21 | 1.57 |
| | 4 | 203.7 | 98.31 | 26.7 | 85 | 0.9966 | 0 | 199.5 | '' | 0.99 | 1.35 |
| | 5 | 203.7 | 142.03 | 27.2 | 155 | 0.9964 | 0 | 200.0 | '' | 1.27 | 1.57 |
| | 6 | 505.5 | 361.07 | 26.4 | 150 | 0.9965 | 0 | 499.8 | '' | 1.96 | 2.09 |
| Angular Momentum A (Mass) | 1 | 202.9 | 273.29 | 21.3 | 79 | 0.9988 | 0 | 183 | 7.245 | — | −1.18 |
| | 2 | 205.7 | 192.18 | 22.5 | 187 | 0.9982 | 0 | 193 | '' | — | 2.95 |
| | 3 | 203.3 | 236.51 | 22.1 | 100 | 0.9988 | 0 | 185 | '' | — | −0.11 |
| | 4 | 204.6 | 189.81 | 23.5 | 190 | 0.9982 | 0 | 192 | '' | — | 3.19 |
| | 5 | 207.1 | 311.33 | 22.5 | 75 | 0.9986 | 0 | 186 | '' | — | −1.29 |
| | 6 | 202.8 | 232.02 | 24.3 | 100 | 0.9988 | 0 | 183 | '' | — | −0.41 |
| | 7 | 233.7 | 109.42 | 30.0 | 157 | 0.9972 | 0 | 210 | '' | — | 0.48 |
| | 8 | 240.7 | 119.73 | 30.5 | 140 | 0.9961 | 0 | 214 | '' | — | −0.33 |
| | 9 | 278.6 | 165.31 | 31.0 | 120 | 0.9955 | 0 | 247 | '' | — | −0.40 |
| | 10 | 204.2 | 297.88 | 29.0 | 46 | 0.9986 | 0 | 179 | '' | — | −2.06 |
| | 11 | 208.0 | 102.27 | 32.5 | 150 | 0.9962 | 0 | 184 | '' | — | −0.46 |
| | 12 | 208.9 | 197.69 | 30.2 | 70 | 0.9984 | 0 | 187 | '' | — | 0.24 |
| | 13 | 204.4 | 152.93 | 30.8 | 85 | 0.9970 | 0 | 182 | '' | — | −0.07 |
| | 14 | 208.6 | 196.26 | 32.2 | 65 | 0.9984 | 0 | 186 | '' | — | −0.84 |
| Angular Momentum B (Mass) | 1 | 211.0 | 96.60 | 40.1 | 120 | 0.9972 | 0 | 187 | 7.245 | — | 1.18 |
| | 2 | 207.2 | 121.85 | 39.3 | 120 | 0.9955 | 0 | 182 | '' | — | 0.28 |
| | 3 | 203.9 | 297.48 | 35.2 | 50 | 0.9986 | 0 | 177 | '' | — | −1.77 |
| | 4 | 208.0 | 102.14 | 41.0 | 150 | 0.9960 | 0 | 183 | '' | — | 0.61 |
| | 5 | 204.9 | 203.69 | 38.7 | 77 | 0.9986 | 0 | 181 | '' | — | 0.55 |
| | 6 | 206.0 | 151.38 | 40.0 | 96 | 0.9970 | 0 | 181 | '' | — | 0.36 |
| | 7 | 513.4 | 241.00 | 42.2 | 160 | 0.9966 | 0 | 450 | '' | — | 0.70 |
| | 8 | 203.7 | 302.93 | 40.0 | 55 | 0.9985 | 0 | 175 | '' | — | −1.90 |

The foregoing table shows that the test standard has a high degree of accuracy and can be used to prove, verify, of calibrate meters in the field. This is amplified by referring to the columns indicating percent error.

Having thus described my invention, what I desire to be secured by Letters Patent of the United States is set forth in the following claims.

1. Apparatus for proving, verifying, and calibrating flow meters used in dispensing cryogenic fluids comprising in combination:

a single non-venting length of conduit having means to admit and discharge fluid;

means in said conduit for measuring the temperature of the cryogenic fluid in said conduit;

means for measuring the pressure of the fluid flowing in said conduit;

a volumetric measuring device of the vortex shedding type in said conduit for measuring flow through said conduit; and means for displaying flow rate as measured by the volumetric metering device whereby the apparatus can be used to measure temperature, pressure, volume, and flow rate for a given time increment and thus be used to prove volumetric or mass flow type meters.

2. Apparatus according to claim 1 including a digital lapsed time indicator.

3. Apparatus according to claim 1 including means to initiate data collection by all measuring means simultaneously.

4. Apparatus according to claim 1 wherein the conduit includes means for straightening the flow characteristics of the fluid prior to the fluid entering the volumetric meter.

5. Apparatus according to claim 1 wherein the temperature of the fluid is determined by measuring the vapor pressure of the fluid.

6. An apparatus for verifying and calibrating volumetric or mass flow cryogenic dispensing meters comprising in combination:

a single non-venting length of conduit to be connected to a source of cryogenic fluid having a meter to be verified;

means for controlling fluid flow through said conduit;

means for measuring the temperature and pressure of the cryogenic fluid in said conduit;

means for straightening the flow of fluid in said conduit prior to entering a vortex shedding type meter for measuring flow rate of said fluid flowing in said conduit;

means for converting flow rate measurement to volume and displaying volume dispensed; and means for establishing data collection of all indicating means simultaneously.

7. An apparatus according to claim 6 wherein the temperature of the fluid is indicated by measuring the vapor pressure of the fluid.

8. A method of verifying a meter used to measure the amount of a liquid cryogen dispensed from a storage receptacle comprising the steps of:

flowing the cryogen through the meter under test and then through a length of non-venting conduit;

measuring the temperature pressure and volume of cryogen flowing through the meter under test and the conduit over a fixed time interval;

calculating mass and volume of cryogen as indicated by the instruments in the conduit; and comparing the conduit measurements to the measurement of the meter under test thus determining the error in the meter under test by dividing the difference between the amount of products measured by the meter under test and the amount calculated from the conduit collected data by the calculated amount of product measured.

* * * * *